UNITED STATES PATENT OFFICE.

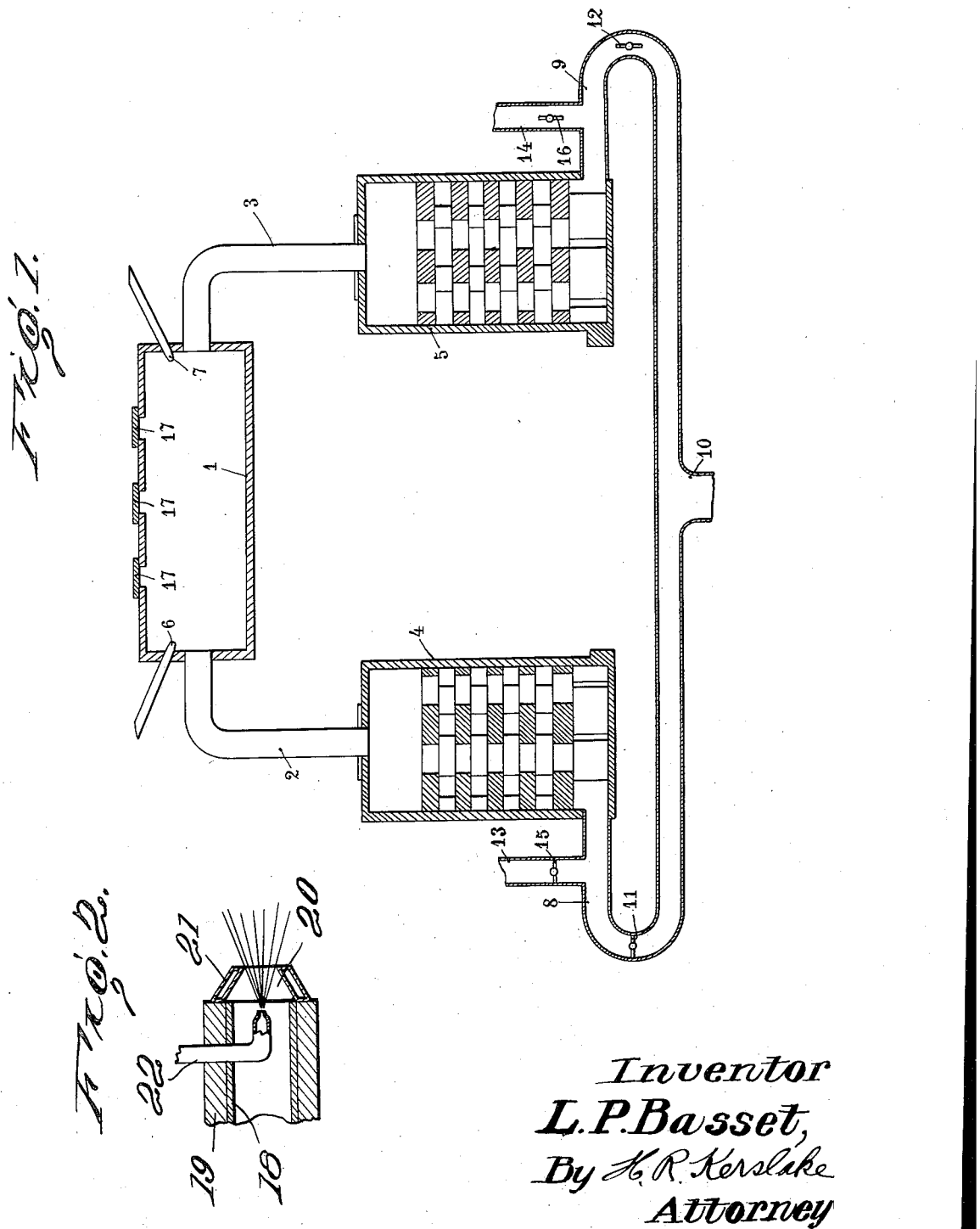

LUCIEN PAUL BASSET, OF PARIS, FRANCE.

PROCESS OF MAKING IRON OR STEEL.

1,419,801. Specification of Letters Patent. Patented June 13, 1922.

Original application filed October 24, 1918, Serial No. 259,558. Divided and this application filed June 4, 1919. Serial No. 301,843.

*To all whom it may concern:*

Be it known that I, LUCIEN PAUL BASSET, of 92 Rue de la Victoire, Paris, France, chemist, have invented a Process of Making Iron or Steel, of which the following is a clear, full, and exact description, this being a division of the application filed by me on October 24th, 1918, Serial No. 259,558 for an improved process for the manufacture of iron and steel directly from the ore, and improved apparatus therefor.

In the application Serial No. 259,558, the applicant has described a process for the manufacture of iron and steel directly from the ore, essentially characterized by the fact that the metal, obtained by reduction of the ore, is melted in a furnace by a flame containing a relatively large per cent of carbon monoxide, which, by reason of its composition, allows neither the carburization nor the combustion of the iron in the course of its fusion; this flame is obtained especially by the combustion in hot air of a pulverized fuel (carbon or liquid fuel), the air and fuel being in such relative proportions as to practically produce carbon monoxide only.

Among the various methods of carrying the process into effect as described in the above mentioned patent, one of them consists in melting on the hearth of a reverberatory furnace the "sponges" of iron obtained by reduction of the ore either in this furnace, or previously in retorts or in another furnace.

The present invention has for its object the application of this process and of this method of carrying the same into effect to the treatment of scrap iron or steel, crop ends, turnings, drillings, planings, etc., occurring in the iron industry, for the direct production of iron or steel on a hearth.

The invention is clearly illustrated in the accompanying drawings, in which:—

Fig. 1 is a longitudinal sectional view, partly in elevation, of a regenerator furnace used for carrying out the improved process, and, Fig. 2 is a longitudinal sectional detail of one form of pulverizing device.

Iron or steel scrap of any kind, the residues of iron works, waste cuts, droppings, drillings, planings, turnings, etc., with or without an admixture of new spongy iron, are melted on the hearth of a furnace heated by a flame containing practically only carbon monoxide. This flame is produced by injecting into the melting furnace a solid or liquid fuel, coal or hydrocarbon, in a state of fine subdivision and at the same time superheated air in quantity necessary and sufficient that the combustion of the fuel produces practically only carbon monoxide. The proportions of air and carbon are so determined that the combustion of the latter shall produce practically only a carbon monoxide flame which will effect the melting of this iron scrap without carburizing or burning the metal. The improved process can therefore be employed with great advantage particularly in the treatment of iron or steel turnings which are highly combustible by reason of their subdivision and the large surface they present to the action of the fire gases.

The proportions of air and carbon may however be varied for the purpose of obtaining either an excess of carbon for carburizing the metal, in view of the manufacture of steel or pigiron, or an excess of air at the end of the melting for the purpose of oxidizing and thereby eliminating the foreign elements, namely silicon, manganese, phosphorous, etc., that may be present in the bath of metal. This last operation is equivalent to an ordinary refining operation and is performed according to the usual methods.

After the complete melting of the metal, and its refining, if need be, there may be added to the metal, before casting the same, any necessary additions in order to give to this metal the required quality.

This apparatus comprises a reverberatory furnace 1 connected at front and back by flues 2, 3, that are well protected from loss of heat by radiation, to heat regenerators 4, 5 filled with refractory chequerwork.

Twyers 6, 7 deliver into the two ends of the furnace for injecting alternately into the latter, exclusively carbon which is supplied by a screw conveyor running at an adjustable speed, and is carried along by a weak current of, preferably hot, air.

The gases of combustion coming from the furnace 1 and issuing from the heat regenerators 4, 5, are received by conduits 8, 9, that deliver into a common conduit 10 and are alternately opened and closed by means of dampers 15, 16.

The operation of this apparatus is as follows:—

The dampers 11 and 16 being closed, and the dampers 15 and 12 being opened, the air delivered by the conduit 13 passes through the heat regenerator 4 into the furnace 1. A wood fire is kindled on the hearth of this furnace and then finely subdivided carbon is injected through the twyers 6 in the requisite proportion to generate carbon monoxide. The latter ignites rapidly and the temperature of the furnace rises. The gases of combustion pass through the heat regenerator 5 to which they give up their heat, and they pass out through the conduit 9 and the conduit 10.

After about one hour, when the brickwork in the regenerator 5 has begun to get red hot, the flow of the gases is reversed by closing dampers 15 12 and opening dampers 16 11. The finely subdivided carbon is then injected through the twyer 7. The combustion of this carbon in the furnace 1 becomes more intense because it is effected by means of hot air. The regenerator 4 is then being heated whilst the regenerator 5 is being cooled.

In this manner the direction of the flow of the gases is reversed alternately at the expiration of a determined period, in such a manner as to reduce the variations in the temperature of the air supply as desired.

When the furnace 1 has been raised to the desired temperature there is introduced upon the hearth of this furnace, either through the doorway or through the charging holes 17 the iron ore in a coarsely or finely crushed state mixed with the requisite fluxes and the quantity of carbon that is just sufficient to reduce the iron oxide to metallic iron.

Under the action of the heat the iron oxide is reduced by the carbon so as to yield metallic iron and carbon monoxide without the possibility of any inverse action taking place, because the flame which is composed exclusively of carbon monoxide and nitrogen, has no effect upon the produced iron.

Under the action of the high temperature of the furnace, the slag forms and melts, and then the iron melts also in its turn. The slag is separated out and the iron is refined if necessary, or receives an admixture of the elements required to produce ordinary steels or special steels. Finally the metal is run off and the furnace is recharged.

The gases generated in the furnace consist of carbon monoxide and nitrogen and have a high fuel value.

This inner lining of the furnace will be acid or basic according to the quality of the metal treated.

The carbon monoxide employed in the present process may also be obtained by the combustion of any carbonaceous products, namely, coal, crude petroleum, etc.

In case crude petroleum is used, the projection of the latter can be easily effected by means of a sprayer; as will be observed upon reference to Fig. 2, this pulverizing device is composed of a tube 18 surrounded by a masonry casing 19 and ending in a conical element 20 having a double casing 21 inside of which circulates water for the purpose of preventing element 21 from being carried to an excessively high temperature. The superheated air is sent into the tube 18. A passage 22 through which the petrol is admitted empties inside this tube 18. The combustion of this petroleum occurs in hot air and the proportion of petroleum projected is adjusted in such a manner that the carbon burns in the state of carbon monoxide, but that the hydrogen, constitutive of the molecule of hydrocarbon, remains in the form of free hydrogen, as its combustion would produce water vapor which would oxidize the iron. The subject matter of the latter invention forms a separate application for Letters Patent, No. 481346 filed June 29, 1921.

I claim:—

1. A process for the direct production of iron and its carbon compounds consisting in causing scrap iron or steel to be melted in a flame containing a relatively large per cent of carbon monoxid and free from carbonic acid and water vapor.

2. A process for the direct production of iron and its carbon compounds consisting in causing scrap iron or steel to be melted in a flame containing carbon monoxide and substantially free from both carbon dioxide and water vapor, said flame being obtained by simultaneously injecting finely pulverized coal and superheated air into the melting furnace.

The foregoing specification of my process for the manufacture of iron or of its carburetted compounds by means of scrap iron and steel, signed by me this 7th day of May, 1919.

LUCIEN PAUL BASSET.